United States Patent [19]

Hanas et al.

[11] Patent Number: 4,709,266

[45] Date of Patent: Nov. 24, 1987

[54] SATELLITE SCRAMBLING COMMUNICATION NETWORK USING GEOGRAPHICALLY SEPARATED UPLINKS

[75] Inventors: Orest J. Hanas, Palatine; Frank C. Pennypacker, Crystal Lake, both of Ill.; Charles B. Radloff; Richard D. Schulman, both of San Diego, Calif.

[73] Assignee: Oak Industries Inc., Rancho Bernardo, Calif.

[21] Appl. No.: 691,513

[22] Filed: Jan. 14, 1985

[51] Int. Cl.$^4$ .............................................. H04N 7/167
[52] U.S. Cl. ....................................... 380/20; 455/12; 455/13; 380/21
[58] Field of Search ................... 178/22.17; 455/12, 13, 455/3, 4; 358/86, 122, 124

[56] References Cited

U.S. PATENT DOCUMENTS

| | | | |
|---|---|---|---|
| 3,835,253 | 9/1974 | Bond | 455/12 |
| 4,228,538 | 10/1980 | Scharla-Nielsen et al. | 455/12 |
| 4,336,553 | 6/1982 | den Toonder et al. | 358/124 |
| 4,418,425 | 11/1983 | Fennel, Jr. et al. | 178/22.17 |
| 4,425,639 | 1/1984 | Acampora et al. | 455/12 |
| 4,484,027 | 11/1984 | Lee et al. | 358/122 |
| 4,506,383 | 3/4985 | McGann | 455/13 |
| 4,538,175 | 8/1985 | Balbes et al. | 455/12 |

Primary Examiner—Stephen C. Buczinski
Assistant Examiner—Aaron J. Lewis
Attorney, Agent, or Firm—Kinzer, Plyer, Dorn, McEachran & Jambor

[57] ABSTRACT

A satellite scrambling communication network uses geographically separated uplinks to provide scrambled video and audio signals and descrambling control data to separated individual subscribers and to separated TV signal distribution systems. The network includes a business control center which provides a master data stream including individual subscriber address and encryption data and uplink channel allocation control data.

A first uplink adds to the master data stream supplementary data peculiar to those TV channel distribution systems which will distribute the one or more TV channels from the first uplink. The transmission at the first uplink, in addition to the one ore more TV channels, includes the master data stream and the supplementary data peculiar to the first uplink. There are a plurality of geographically seperated additional satellite communication uplinks, each including means for receiving the master data stream as transmitted from the first uplink via the communication satellite. Each additional satellite communication uplink further includes means for transmitting one or more TV channels, as controlled by the allocation data in the master data stream.

Each individual subscriber receiver/decoder is controlled by the master data stream. There are a plurality of geographically separated TV signal distribution systems, each with antenna means for receiving the TV channels from one or more of the uplinks. Each TV signal distribution system is controlled by the supplementary data streams which accompany the one or more TV channels from each of the uplinks.

6 Claims, 2 Drawing Figures

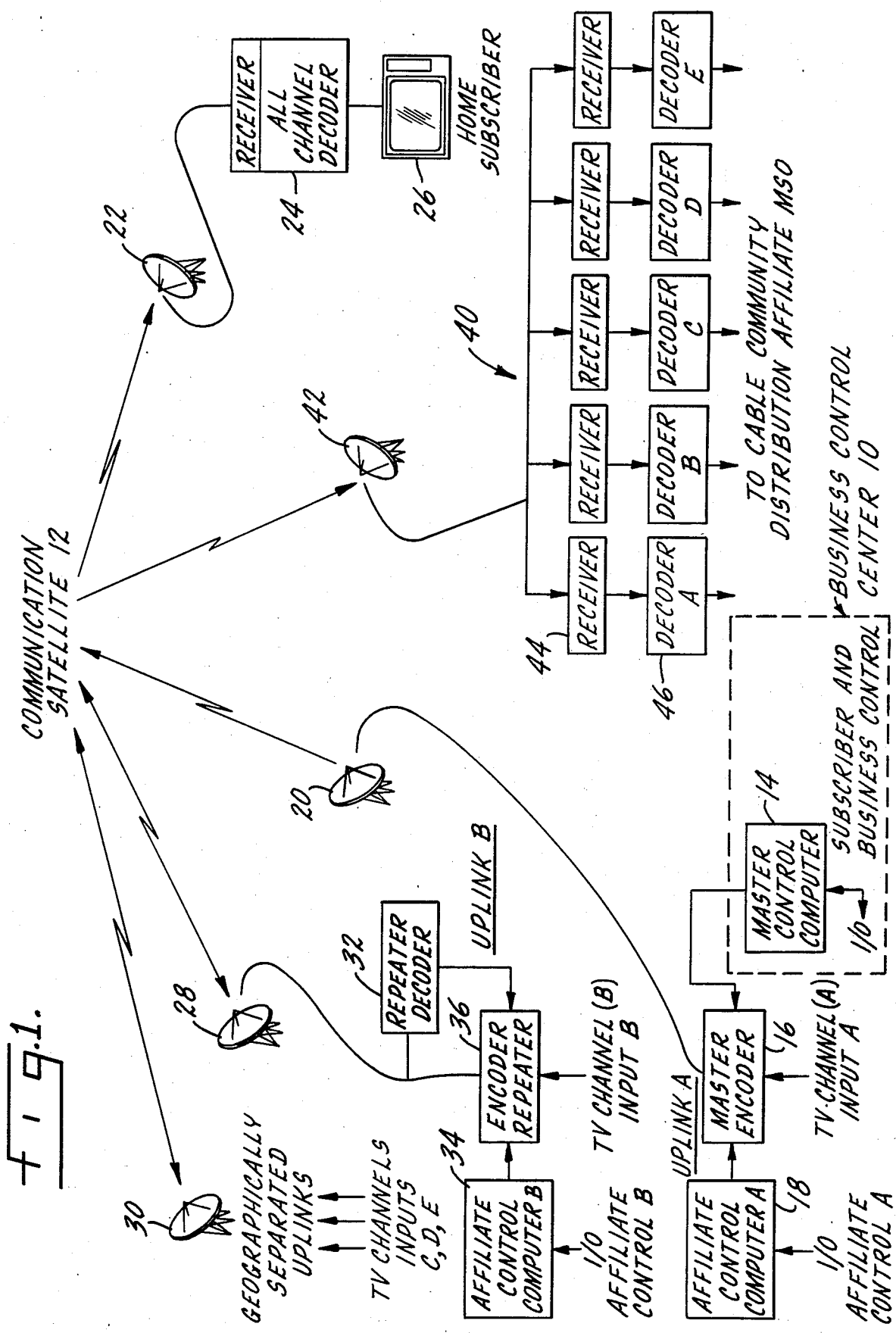

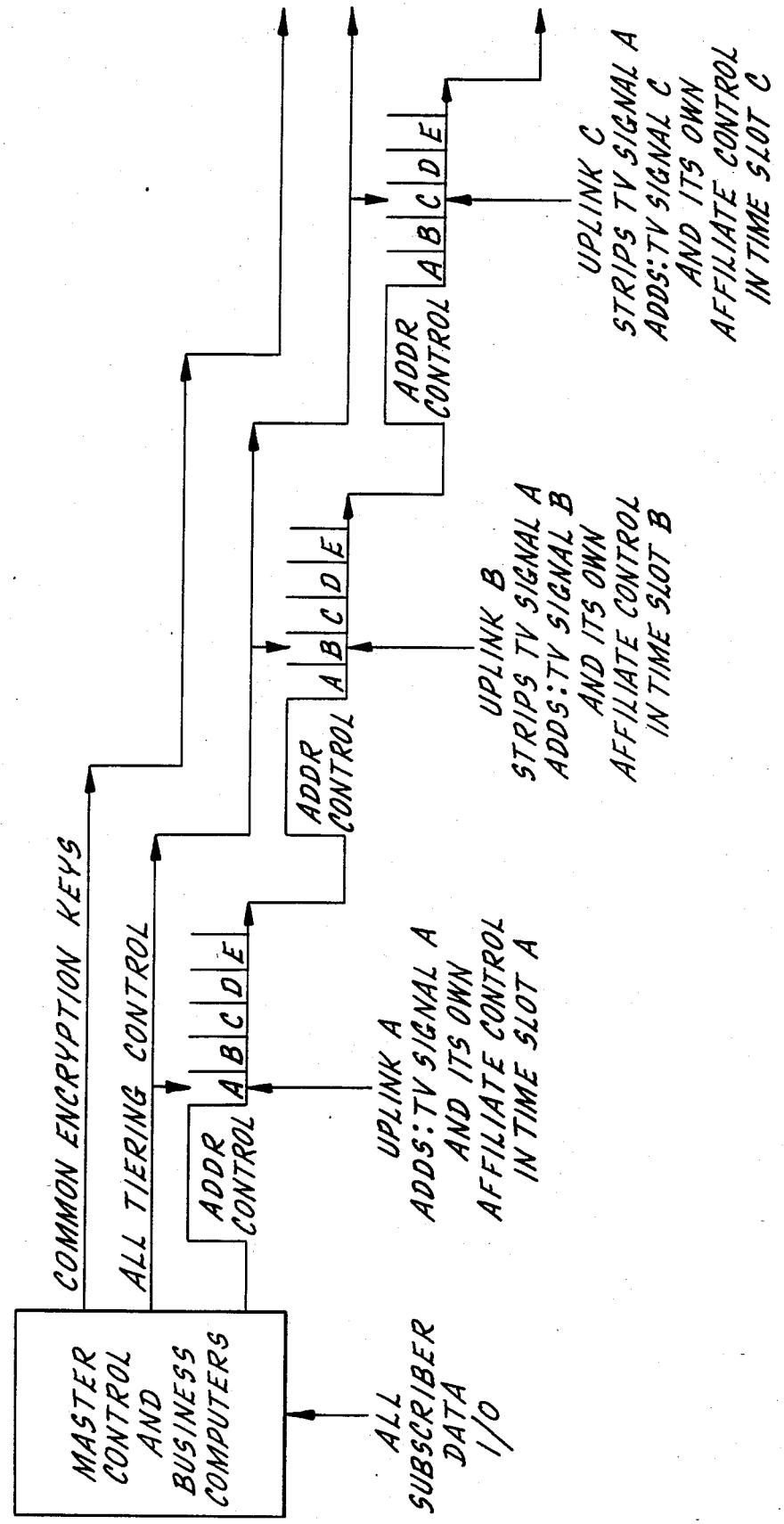

SATELLITE SCRAMBLING COMMUNICATION NETWORK USING GEOGRAPHICALLY SEPARATED UPLINKS

SUMMARY OF THE INVENTION

The present invention relates to a satellite scrambling communication network using geographically separated uplinks to provide scrambled television programs, both to multiple individual widely separated subscribers and to cable television distribution systems.

A primary purpose is a satellite network of the type described in which a business control center provides a master data stream which is used to control the descrambling of television signals at multiple individual subscribers and to control geographically separated satellite uplinks so that the uplinks may separately communicate their signals to affiliate cable systems and to the multiple individual subscribers.

Another purpose is a satellite distribution system of the type described in which the master data stream controlling both the individual subscribers and the uplinks is transmitted to the satellite by one uplink, which master data stream is then transmitted by the satellite to all of the other uplinks, regardless of geographic location, with each of the uplinks adding its own supplementary data to control its own cable affiliates.

Another purpose is a satellite network of the type described in which one satellite uplink transmits the master data stream and individual geographically separated uplinks provide supplementary data to control their own cable affiliates.

Other purposes will appear in the ensuing specification, drawings and claims.

BRIEF DESCRIPTION OF THE DRAWINGS

The invention is illustrated diagrammatically in the following drawings wherein:

FIG. 1 is a diagrammatic illustration of a satellite network of the type described, and FIG. 2 is a time diagram illustrating the master and supplementary data streams used in the control of the communication network.

DESCRIPTION OF THE PREFERRED EMBODIMENT

The present application relates to the distribution of premium television communications and specifically to a satellite communication network in which premium television programs, voice and data communications normally with the video signal scrambled and the audio and data encrypted, are transmitted to multiple individual subscribers by a communication satellite and to cable television distribution systems which will then distribute such signals to subscribers over cable or microwave facilities. Although the following description will use the phrase "television communications," this is meant to include broadly video, voice and data communications from many sourcces, and also to include addressable secure communication systems. At the present time there is a vast number of cable systems throughout the United States which transmit over a variety of channels, such TV communications network programs, locally-originated programs and premium programs, such as movies or the like, which are supplied to the cable systems by such programmers as Home Box Office, Showtime, Disney, Turner and the like. Each of the premium programmers rents or owns a transponder on one or more of the available communication satellites so that the one or more channels transmitted from the programmer by its uplink can then be received by one or more of the cable systems geographically separated around the country. In effect, each premium programmer has an uplink by which it communicates to a communication satellite so that its affiliate cable systems may receive the premium programming for distribution to cable customers. Although we use the term "cable," it should be understood that this also includes microwave and other types of distribution systems.

The control of the television channels by the premium programmer is such that only those affiliate or cable systems associated with the programmer or those who pay to receive the service can receive and properly decode the scrambled signals. This system works satisfactorily, without any central control, but it does not provide any central supervision whereby individual subscribers may directly receive premium programming from a satellite and there are many individual subscribers who are in locations where there is no access to cable facilities or who may be unwilling to subscribe to a cable system and pay the consequent monthly rental fee when they are only interested in premium programming such as movies and special events. Accordingly, there is a very substantial market for direct communication of television communications to individual subscribers or individual network members. At the same time, there is a need for controlling and coordinating the distribution of signals by satellite to provide a more cost efficient communication network.

The present invention provides a means whereby from a centrally located control center, a master data stream is provided to control the access of individual subscribers or subscriber groups or networks to all of the premium programming which may be available on any one or all of the uplinks geographically separated around the United States. The master data stream is also used to provide a means for control of the individual uplinks, each one under the control of a specific premium programmer so that the individual uplinks can provide restricted access to those cable systems which desire their service. In effect, the master data stream controls the individual subscribers, their addressing and encryption codes and thus decoding of premium program signals from all of the uplinks around the country. The master data stream also allocates channels for the programmer uplinks to prevent overlap and conflict between channels. The master data stream is supplemented by each premium programmer to an extent that permits such premium programmer to control its own cable system affiliates. Thus, one network combines a plurality of television communication channels, as many as 50 or more, from a variety of geographically separated uplinks, each one separately controlled by a premium programmer, to enable a combination of this vast array of television communications to be available to individual subscribers around the country and to be independently and separately available to various cable systems.

In FIG. 1, the business control center is indicated at 10 and includes a master control computer which will have address information, video scrambling codes and encryption data for each of the home subscribers who are equipped to receive signals from the satellite diagrammatically illustrated at 12. The type of scrambling system may vary widely and one appropriate system for the scrambling of video and audio signals is that disclosed in U.S. Pat. Nos. 4,424,532, 4,353,088, 4,340,906, 4,336,553, 4,323,922 and 4,112,464. Other types of audio and video scrambling and encryption systems may also be used, but the above patents disclose a system now used by the assignee of the present application.

At the control center 10 master control computer 14 provides the master data stream which, as illustrated in FIG. 2, will include the encryption keys and associated address information for all of the home subscribers, and a tiering control or channel allocation for all of the geographically separated uplinks. The master data stream will be sent to a master encoder 16 which may be physically located at one of the geographically separated uplinks, in this case, an uplink designated uplink A.

Uplink A will provide an input to the master encoder of one or more TV channels, as well as providing supplementary control data, which will enable the cable affiliates served by uplink A and which subscribe to its premium programming, to receive and utilize the scrambled television communications broadcast by uplink A. Uplink A has an affiliate control computer 18 which provides the supplementary data to the master encoder where the affiliate control data is combined with the master data stream and then transmitted by an antenna 20 at uplink A to communication satellite 12.

As illustrated in the time diagram of FIG. 2, the master data stream includes the common encryption keys which will be sent directly to the individual home subscribers, tiering control or channel allocation signal, and subscriber control and address information. The tiering control or channel allocation signal will provide for each of the individual uplinks to add supplementary data for control of their individual affiliate cable systems. As illustrated in FIG. 2, uplink A has a time slot A wherein its supplementary data may be added.

What is transmitted from antenna 20 of uplink A is the master data stream, the supplementary data stream from uplink A and the TV channels normally broadcast from uplink A to the communication satellite.

The master data stream includes address and decoding control information whereby each individual home subscriber or subscriber network receives what premium programming it desires to receive and is willing to pay for. This may include the TV communication channels broadcast by any one or all of the various uplinks and this distribution is controlled by the master data stream provided by the business control center, which master data stream is sent to the satellite by uplink A. An antenna 22, diagrammatically represents one subscriber's antenna and the antenna is connected to a receiver/decoder 24 which in turn is connected to the subscriber's television receiver 26. Thus, the receiver/decoder of each individual subscriber will be controlled by the master data stream so that a particular subscriber may descramble and decrypt those television channels which it has agreed to pay for.

The information transmitted from antenna 20 of uplink A to the communication satellite is also received by the antennas of geographically separated additional uplinks, indicated at 28 and 30. Each of these antennas may represent an uplink which may be located in any part of the United States and which will use communication satellite 12 to broadcast television communications to affiliate cable systems. The uplink associated with antenna 28, designated uplink B, includes a repeater-decoder 32, an affiliate control computer 34 and an encoder-repeater 36. The signal received by antenna 28 is that transmitted by uplink A antenna 20. The repeater-decoder 32 removes the TV signals from uplink A and passes the master data stream to encoder-repeater 36. The supplementary address and authorization data for uplink B is provided by affiliate control computer 34 to encoder 36. The TV channels allocated to uplink B and its supplementary data will be sent from encoder-repeater 36 to the antenna for broadcast to the satellite so that the premium channels of uplink B can be available to its affiliate cable systems and to those home subscribers who are willing to pay for it. Thus, the signal received from the satellite by those uplinks other than the uplink transmitting the master data stream use the received data stream to control channel allocation. Each uplink supplements the master data stream with the control signals necessary to control access of the cable systems which can receive and utilize the premium programming broadcast by a particular uplink. As shown in FIG. 2, there is a time slot for the supplementary data from each uplink.

The supplementary data streams from each uplink may be as shown in FIG. 2 and such may be transmitted in channel or out of channel. In the alternative, the master and supplementary data streams may use designated lines in the vertical blanking interval or in the horizontal blanking interval. In one system lines 7 and 8 of the vertical blanking interval may be used by each uplink to communicate with its affiliates and lines 1-5 of the vertical blanking interval may be used for the waste data stream to transmit address and decoding information to individual subscribers. In another alternative, the master and supplementary data streams may be carried by a subcarrier of either the video or audio signal.

There may be as many uplinks as there are available transponders on the satellite and these uplinks may be at any geographical location within the United States. The master data stream provides the control for the individual subscribers and controls the channel allocation of the individual uplinks which themselves are controlled by particular premium programmers. Each of the uplinks adds its own supplementary data for use by its affiliate cable systems so that only those television communications desired by a specific cable system will be received and utilized by it.

A typical community cable system is indicated generally at 40 and includes an antenna 42 and a plurality of receivers 44, one designated for each of the uplinks. With each receiver there is a decoder 46 which is to decode the signals from a particular uplink. Thus, a cable community affiliate may receive programs from all of the premium programming uplinks or from as few such uplinks as it desires. What is received by each cable system 40 is controlled by the supplementary data added at each of the uplinks.

Whereas the preferred form of the invention has been shown and described herein, it should be realized that there may be many modifications, substitutions and alterations thereto.

The embodiments of the invention in which an exclusive property or privilege is claimed are defined as follows:

1. A satellite scrambling communications network using geographically separated uplinks to provide scrambled video and audio signals and descrambling control data to separated individual subscribers and to separated TV signal distribution systems, including:
- (a) a business control center providing a master data stream including individual subscriber address and encryption data and uplink channel allocation control data, and including means for communicating said master data stream to a first satellite communication uplink,
- (b) a first satellite communication uplink for transmitting one or more TV communication channels, as controlled by the allocation data in the master data stream, to a communication satellite, means at said first uplink for adding to the master data stream, supplementary data, peculiar to those TV signal distribution systems which will distribute the one or more TV communication channels from said first uplink, and means at said first uplink for transmitting the master data stream and supplementary first uplink data stream to the communication satellite,
- (c) a plurality of geographically separated additional satellite communication uplinks, each including means for receiving the master data stream as transmitting from the first uplink via the communication satellite, means at each additional uplink for transmitting one or more TV communication channels, as controlled by the allocation data in the master data stream, to the communication satellite, means at each additional uplink for adding to the master data stream, supplementary data peculiar to those TV distribution systems which will distribute the one or more TV communication channels from each additional uplink, and means at each additional uplink for transmitting the supplementary data peculiar thereto to the communication satellite,
- (d) multiple individual subscriber receiver decoders, each having antenna means for receiving the TV communication channels as transmitted by the uplinks via the communication satellite, each subscriber receiver decoder being controlled by the master data stream,
- (e) a plurality of separated TV signal distribution systems, each with antenna means for receiving the TV communication channels from one or more uplinks via the communication satellite, each TV distribution system being controlled by the supplementary data streams from said uplinks.

2. The communication network of claim 1 further characterized in that each of the supplementary data streams are timeseparated in the master data stream.

3. The communication network of claim 1 further characterized in that the master data stream and the supplementary data stream are inserted into designated spaces in the video signal transmitted from said first uplink.

4. The communication network of claim 3 further characterized in that the master and supplementary data streams are inserted into the vertical blanking interval of the video signal.

5. The communication network of claim 3 further characterized in that the master and supplementary data streams are inserted into the horizontal blanking interval of the video signal.

6. The communication network of claim 3 further characterized in that the master and supplementary data streams are inserted on a subcarrier of the video signal.

* * * * *